United States Patent
Lee

(10) Patent No.: US 7,231,003 B2
(45) Date of Patent: Jun. 12, 2007

(54) SYSTEM AND METHOD FOR ALIGNING DATA BETWEEN LOCAL AND REMOTE SOURCES THEREOF

(75) Inventor: Tony J. Lee, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 693 days.

(21) Appl. No.: 09/895,493

(22) Filed: Jun. 29, 2001

(65) Prior Publication Data

US 2002/0146076 A1 Oct. 10, 2002

Related U.S. Application Data

(63) Continuation-in-part of application No. 09/827,513, filed on Apr. 5, 2001.

(51) Int. Cl.
*H03D 3/00* (2006.01)
(52) U.S. Cl. .................. 375/335; 375/345; 370/228; 370/243; 370/242; 714/748; 714/713
(58) Field of Classification Search ............... 375/257, 375/335, 345; 370/242, 244, 228, 243; 361/69, 361/64; 455/440; 714/748, 713
See application file for complete search history.

(56) References Cited

U.S. PATENT DOCUMENTS

| | | | | |
|---|---|---|---|---|
| 3,663,762 A | * | 5/1972 | Joel, Jr. | 455/440 |
| 4,760,487 A | * | 7/1988 | Kwong et al. | 361/64 |
| 5,543,995 A | * | 8/1996 | Kumagai et al. | 361/65 |
| 5,793,750 A | * | 8/1998 | Schweitzer et al. | 370/242 |
| 5,838,525 A | * | 11/1998 | Ward et al. | 361/69 |
| 5,982,595 A | * | 11/1999 | Pozzuoli | 361/62 |
| 2001/0015107 A1 | * | 8/2001 | Feller | 73/861.27 |

* cited by examiner

*Primary Examiner*—Chieh M. Fan
*Assistant Examiner*—Eva Zheng
(74) *Attorney, Agent, or Firm*—Cook Alex McFarron Manzo Cummings & Mehler, Ltd.

(57) ABSTRACT

The communication system includes two communication channels for communication of protection and control information between two protective relays on a power line portion of an electric power system. A switch provided at the receiving relay connects one communication channel and provides a connecting link between the communication channel and the receiving relay. The transmitted data is applied on both communication channels and processed substantially identically. When the one communication channel is indicated to be faulty, the switch in the receiving relay is operated to connect the second communication channel, thereby substantially preventing delay in the receipt of the data from the transmitting relay.

10 Claims, 4 Drawing Sheets

SYSTEM AND METHOD FOR ALIGNING DATA BETWEEN LOCAL AND REMOTE SOURCES THEREOF

PRIOR APPLICATION

This application is a continuation in part application of U.S. application Ser. No. 09/827,513, filed Apr. 5, 2001.

TECHNICAL FIELD

This invention relates generally to the transmission of data between two sources thereof and the comparison of such transmitted data, and more specifically concerns a data transmission system having the capability of aligning the data from two sources prior to comparison thereof.

BACKGROUND OF THE INVENTION

Comparison of data from two remote sources is done for various reasons; preferably, the data sets are aligned, so that accurate comparison is possible. This is true regardless of whether the data is transmitted synchronously or asynchronously.

One example of a system using data comparison is a differential relay which is used for protection of an electric power system. The relay in operation compares the electrical current values on the power line at a local source of electric current values (referred to as the local relay) and a remote source of current values on the same line (referred to as the remote relay). If the current differential comparisons performed by the relay are to be accurate, initial alignment of the two sets of data (from the local and remote sources) before the comparisons are made is important.

Other applications where alignment of data is important are well known. These include, among others, event recorder systems and breaker failure systems in power protection applications and metering systems, which are broader than power protection, as well as other situations where alignment of data between local and remote sources is important, typically for comparison purposes.

Basically, the alignment problem with two sets of data occurs because of differences in the sampling of the two data sets, one local data set and one remote. The sampling for instance could be different in phase, or the sampling frequency could be different between the two data sets. These differences result in an unknown and changing phase shift between the two data sets. Further, the sampled data from the remote source, when transmitted to the local source for comparison, arrives with a time differential relative to the sampled data at the local source, due to the unknown transmission time (delay) between the two data sources.

DISCLOSURE OF THE INVENTION

Accordingly, the present invention is a system for communicating data between at least two protective relays monitoring an electric power system, comprising: first and second communication channels extending between first and second protective relays operating on a power line portion of an electric power system, for communication of protection and control information between relays; means applying data to be transmitted from the first relay to the second relay along both first and second communication channels; and a switch at the second relay connecting one selected communication channel such that processed data from the connected communication channel controls outputs of the second relay, the switch being responsive to an indication that the selected communication channel is faulty to switch to connecting said second communication channel, thereby minimizing any delay in continuing to receive data from the first relay.

BEST MODE FOR CARRYING OUT THE INVENTION

Figure 1:
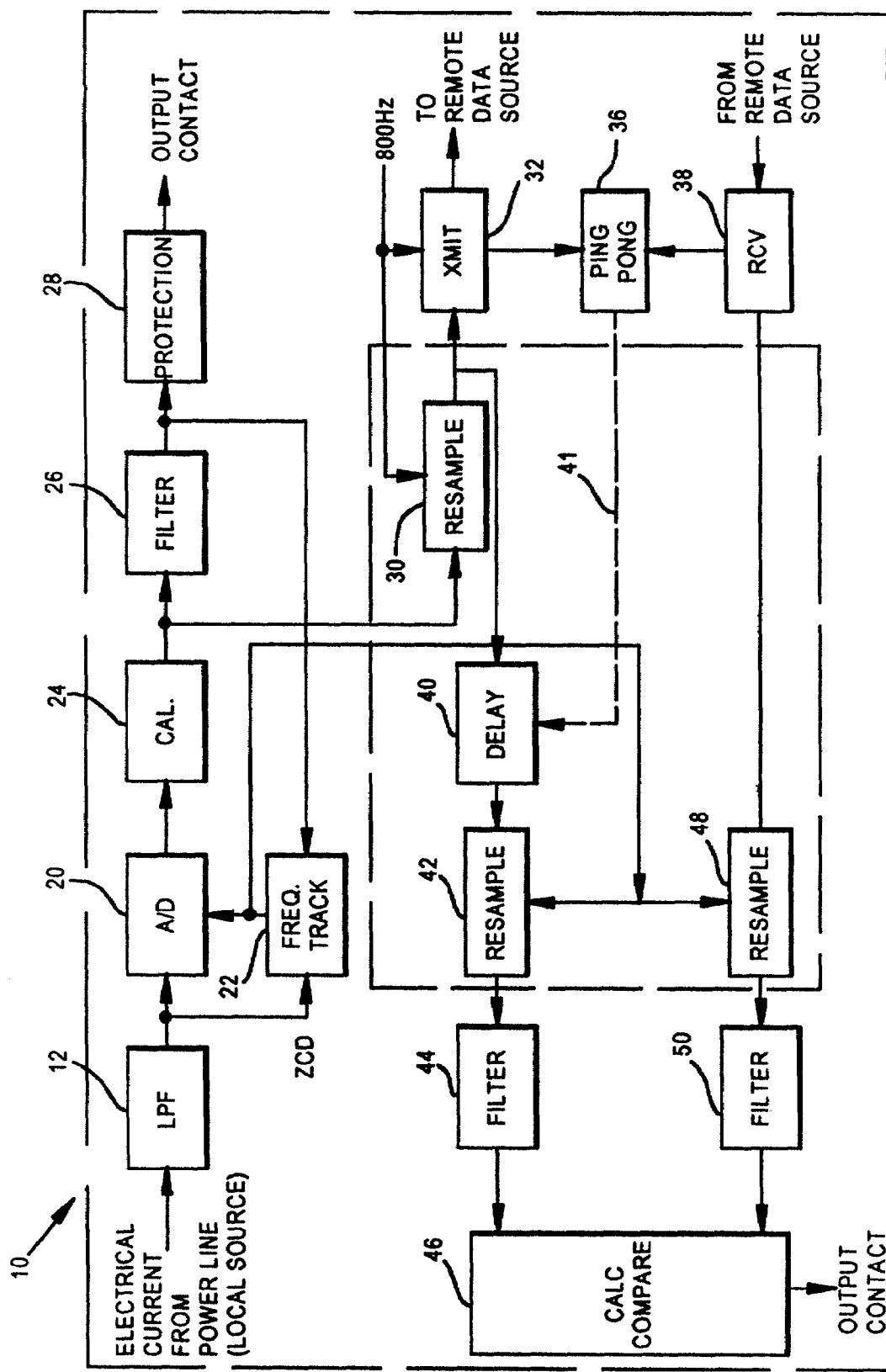
FIG. 1 is a block diagram showing the system of the present invention with a local source of data and a remote source of data, with both data sets being electrical current values from a power line.

FIG. 1 is a block diagram showing the basic system of the present invention for the application of a differential current relay used for protection of an electric power line. However, it should be understood that such an application of the present invention is for illustration purposes only and is not intended to limit the scope of the invention.

In FIG. 1, the analog electrical current signal from a power line (the signal level being decreased by a current transformer) at a given point on the power line which is the location of the local relay referred to at 10 is applied to a low pass filter portion 12 of the relay. The location is a specific physical point on the power line. A similar data source/relay to that shown at 10 is located remotely from the local data source on the same power line.

Referring still to FIG. 1, the local data set (e.g. electric current signals from the power line at the local relay), initially filtered by low pass filter 12 and then applied to an analog-to-digital (A-D) converter 20. The A-D converter 20 is driven by a frequency tracker 22 to sample the analog current signal 16 times (in the embodiment shown) per power system cycle. The digitized signal is then calibrated at 24 and filtered through a full cycle cosine filter 26.

The resulting signal is then applied, in the embodiment shown, to a conventional protective relay algorithm circuit 28 to provide backup protection which is separate from and in addition to the protection based on comparisons of currents from local and remote sources which is provided by the remainder of FIG. 1. Such backup protection could be based on impedance calculations (distance protection), current magnitude calculations (overcurrent protection) or other types of protection which require signals from only one end of the protected line.

The output of the cosine filter 26 is applied back to frequency tracker 22 as is zero crossing detection information (ZCD) from the low pass filter 12 to control the sampling rate of the analog signal.

The elements discussed above, from low pass filter 12 through cosine filter 26, are all conventional and are part of a conventional protective relay application. The present invention is explained below as part of such an application. As indicated above, however, the data alignment system of the present invention can be used in other applications.

Referring still to FIG. 1, the output of calibration circuit 24 is applied to a first resample circuit 30 which, in the embodiment shown, operates at a frequency of 800 Hz, which is the framing rate for transmitting circuit 32. Circuit 32 transmits the local resampled data from first resample circuit 30 to the remote data source/relay. The analog data signal from the local source thus is sampled at a rate of 16 times the power system frequency (which is typically 60 Hz) by frequency tracker 22 and then sampled again at a first resampling frequency, which in the embodiment shown is 800 Hz. The first resampling frequency can vary, but should be equal to the transmitting framing rate, as indicated above.

Because the first resampling circuit 30 and the transmit circuit 32 are driven by the same frequency signal, exactly one set of sampled data is available for each transmitted frame. In the embodiment shown, transmit circuit 32 also compresses the local source data set to 8 bits. The receiver at the remote data source/relay will expand the received data from the local source from 8 bits to the original full number of bits of information present at the local source/relay, prior to comparison of the two data sets. The signal transmitted to the remote source/relay is, in the embodiment of FIG. 1, thus the digital signal from the A-D converter 20 which has been resampled at a first resample frequency.

The resampled signal from the first resample circuit 30, besides being applied to transmit circuit 32, is also applied within the local source circuitry to a delay circuit 40. Delay circuit 40 delays the signal from the first resample circuit 30 by a specified time amount; i.e. the one-way transmission delay time between the remote source and the local source. The delay amount is determined by a "ping-pong" circuit 36. Briefly, the one-way transmission delay time is estimated as being approximately half the round-trip delay time. To measure the round-trip delay time, the local data source tags each message as it goes out to the remote source with an indicator, and then determines how long it takes to receive a response from the remote source to that message at receive circuit 38. The response message contains a field which includes the amount of time elapsed at the remote source between reception of the message there and transmission back to the local source. The one-way transmission delay time is the amount of the round-trip delay minus the time that the remote source holds a message from the local source before responding, divided by two. Hence, ping-pong circuit 36 obtains information from the transmit circuit 32 and receive circuit 38 to determine the actual transmission delay. The amount of delay is then sent to the delay circuit 40, as shown by dotted line 41.

The output from the first resampling circuit 30 is delayed by the specified delay amount from ping pong circuit 36 and applied to a second resampling circuit 42. The second resampling circuit 42 is set to sample at a frequency equal to the local frequency tracking rate, i.e. the initial sampling frequency which, in this particular embodiment, is 960 Hz. The output of the second resampling circuit 42 is applied to a digital filter 44 which is used to remove harmonics and other noise produced by the resampling circuit or present in the original local source data set. The output of filter 44 is then provided to local data calculation (and comparison) circuit 46. The arrangement and purpose of the calculation circuit may, of course, vary depending upon the particular application. In the present case, it performs the comparison with the remote data and produces the control signal which is applied to a contact output which in turn operates to result in opening of the system circuit breaker when the comparison indicates a fault on the line.

Data from the remote data source is received at receiver 38 at the local source, as explained above. The data from receiver 38 is applied to another second resampling circuit 48, which is identical to second resampling circuit 42. Resampling circuit 48 could be combined with resampling circuit 42, if desired. The data applied to resampling circuit 48 is coincident in time with the local data applied to the second resampling circuit 42, due to delay circuit 40. Accordingly, the data applied, respectively, to second resampling circuits 42 and 48, from the local source of data and the remote source of data, are aligned in time.

Resampling circuit 48 resamples the data applied to it at the same frequency used by second resampling circuit 42, i.e. the frequency used to sample the local source analog data. Since the two data streams are sampled at the same frequency, there will be phase alignment between the two sampled signals. The data from second resampling circuit 48 is applied to a filter 50, which is identical to filter 44, and then applied to the calculation and comparison circuit 46, which as explained above, makes comparisons in a conventional fashion to provide protection for the power line.

Hence, the circuit of the present invention as shown in FIG. 1 provides a convenient and reliable way to align data from local and remote sources so as to permit accurate comparison results.

In a modification of FIG. 1, particularly where bandwidth is not a concern, the first resample circuit 30 could be eliminated, with the output of calibration circuit 24 being applied directly to transmit circuit 32 and delay circuit 40. Hence, reference to the output of delay circuit 40 means either a delay of the initially sampled local source signal (from calibration circuit 24) or a delay of a resampled local source signal (such as from resample circuit 30).

Also, in the specific circuit of FIG. 1, with a first resampler 30, since the signal which is applied to delay circuit 40 from first resample circuit 30 is a discrete time sampled signal, delay circuit 40 is actually also in effect a resampler, since delay of a sampled signal is accomplished by resampling, i.e. interpolation between the original samples. Delay circuit 40 could be and typically is integrated with resample circuit 42 (but not resampler 48).

Figure 2:
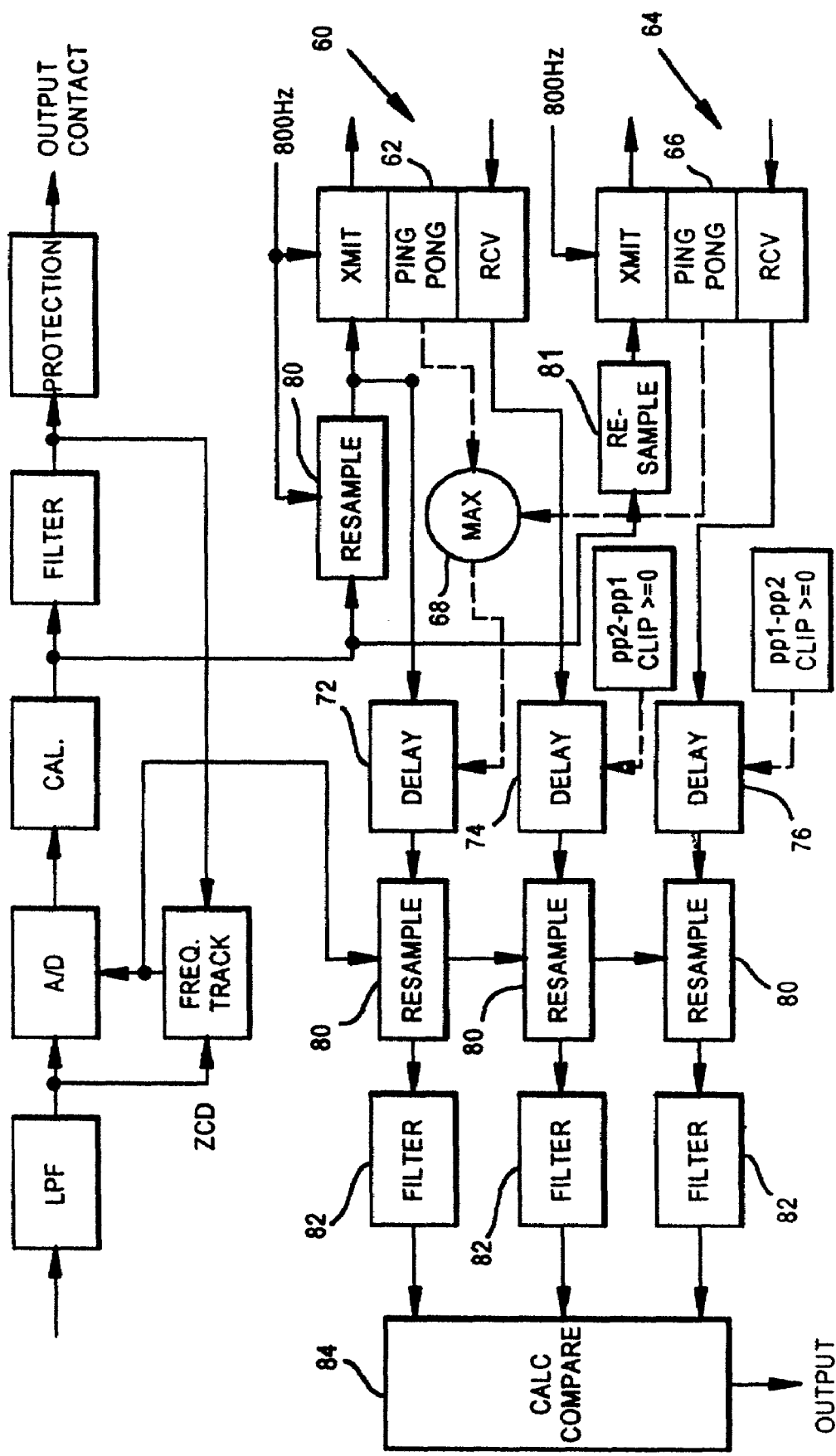
FIG. 2 is a block diagram showing a variation of the system of FIG. 1, with one local source of data and two remote sources of data.

FIG. 2 shows a variation of FIG. 1, involving a local source of data and two remote sources of data. In this case, there are two remote data transmit/receive channels at the local data source for receiving data from the remote sources. The first channel for the first remote source of data is referred to at 60. The first channel 60 includes a first delay value (pp1) determination from "ping-pong" 62 for the one-way transmission delay between the local source and the first remote source. The same is done for the second transmitter/receiver channel 64, with ping-pong circuit 66 determining a second delay value pp2.

The delay values (pp1 and pp2) are applied to a comparison circuit 68, which determines which of the two delay values is the largest. The local source data is delayed (delay circuit 72) by the larger of the two one-way transmission delays. The remote channel with the smaller one-way transmission delay has its data delayed by the difference in the two transmission delays, as shown in FIG. 2. The remote channel with the larger one-way transmission delay does not have its incoming data delayed. Delay circuits 74 and 76 are set accordingly. Circuit arrangements are provided at each of the three data source locations (the three individual terminals), with each location having one local data source and two remote sources.

Hence, the local source data directly from first resample circuit 80 experiences the longest delay, while the remote channel with the smaller of the two calculated transmission delays, either channel 60 or 64, is delayed by the difference between the larger and the smaller of the two remote transmission delay times. The local source data is taken arbitrarily (it is a matter of choice) from the resampler associated with the first channel 60. It could also be taken from the resampler 81 associated with the second channel 64.

The result of the delay arrangement of FIG. 2 is that the data from the local source and the two remote sources are all aligned in time at the local source. The data sets from delay circuits 72, 74, 76 are then sent to identical second resample circuits 80-80, which resample each signal at the original sampling frequency. The output of the second resampling circuits 80-80 are applied to identical filters 82-82, and from there to calculation and comparison circuit 84. Again, the calculation/compare circuit 84 is not part of the present invention. The output of circuit 84 is applied to output contacts which control the circuit breaker for the power line.

In the three source implementation of FIG. 2, it is uncertain as to whether or not the average transmit frame rates (800 Hz in FIG. 2) are identical. In fact, there is no such requirement. For example, if channel 60 is a 64 k baud channel and channel 64 is a 56 k baud channel, the transmit frame rate for channel 60 will be 800 Hz and the transmit frame rate for channel 64 will be 700 Hz. The present method/apparatus of data alignment works equally well with matched or mismatched transmit frame rates.

Again with respect to the three source implementation of FIG. 2, the resampling circuits 80 and 81 could be eliminated as discussed above with respect to FIG. 1.

When an error occurs during data transmission in the system of either FIG. 1 or 2, the receiving relay cannot use the message content. Since it is important to continue to transmit valid information so that the remote data source/relay can continue to accurately perform its own protection requirements, no response is generated to a corrupt message; the local relay simply responds to the previous uncorrupted message. The number of transmissions between valid receptions thus increases. The local relay must in that case tolerate the possibility of its transmission of two messages between receptions of valid messages at times, and the remote relay must be tolerant of reception of two responses to some transmitted messages.

With respect to analog data which may be lost in the transmission process, the local relay may be designed to interpolate the actually received data to, in effect, recapture the lost data. The digital filter then removes certain undesired effects produced by the interpolation. However, if too much data is lost to permit successful data replacement by interpolation, the data alignment system is suspended and further processing (comparison) using aligned data is not possible until communication is restored and the output of the filters have stabilized.

Hence, a new system of aligning data between a local and a remote source or source has been disclosed. The system takes into account and corrects for both the transmission delay time between the local and remote data sources and the differences in the initial phase/frequency sampling of the data.

When data is communicated between two protective relays, such as in a differential comparison relay arrangement involving local and remote relays, wherein selected electrical values from a power line at a remote relay source are compared with electrical values at a local relay source, such as discussed above, the electrical data is transmitted between the relays over a communication channel. In many instances, a redundant or backup channel is provided in case the primary channel goes down (becomes faulty). Typically, the transmitting relay includes a switch, which, upon recognition by the system that the primary communication channel is faulty, switches to the backup communication channel. While such an arrangement provides a substitute for the faulty channel and thus maintains communication between the two relays, there is a delay in the received data, i.e. bad data is received from the time that the original channel goes bad (faulty) to the time that the system is switched to the backup channel plus the time it takes for data to reach the receiving relay following switching of the communication channel. This delay or break in the data can result in a delay of a tripping action if a fault indication were present during the delay time.

Figure 3:
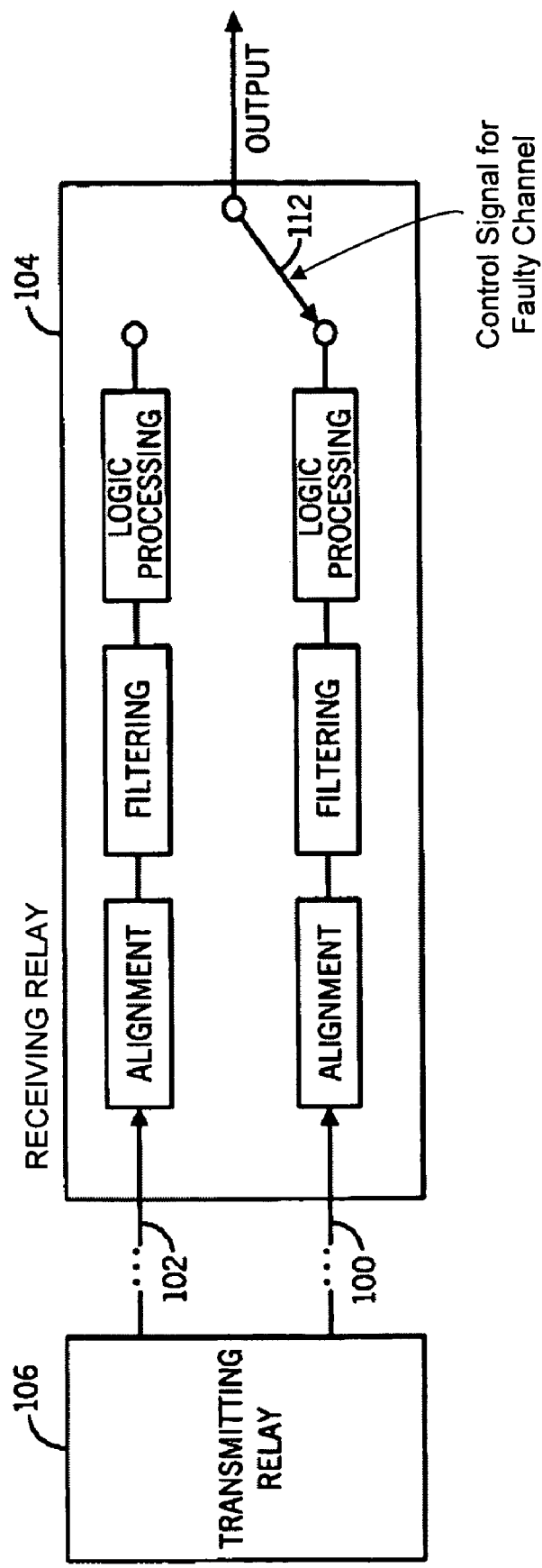
FIG. 3 is a block diagram showing a new dual communication line arrangement for local and remote data sources.
Figure 4:
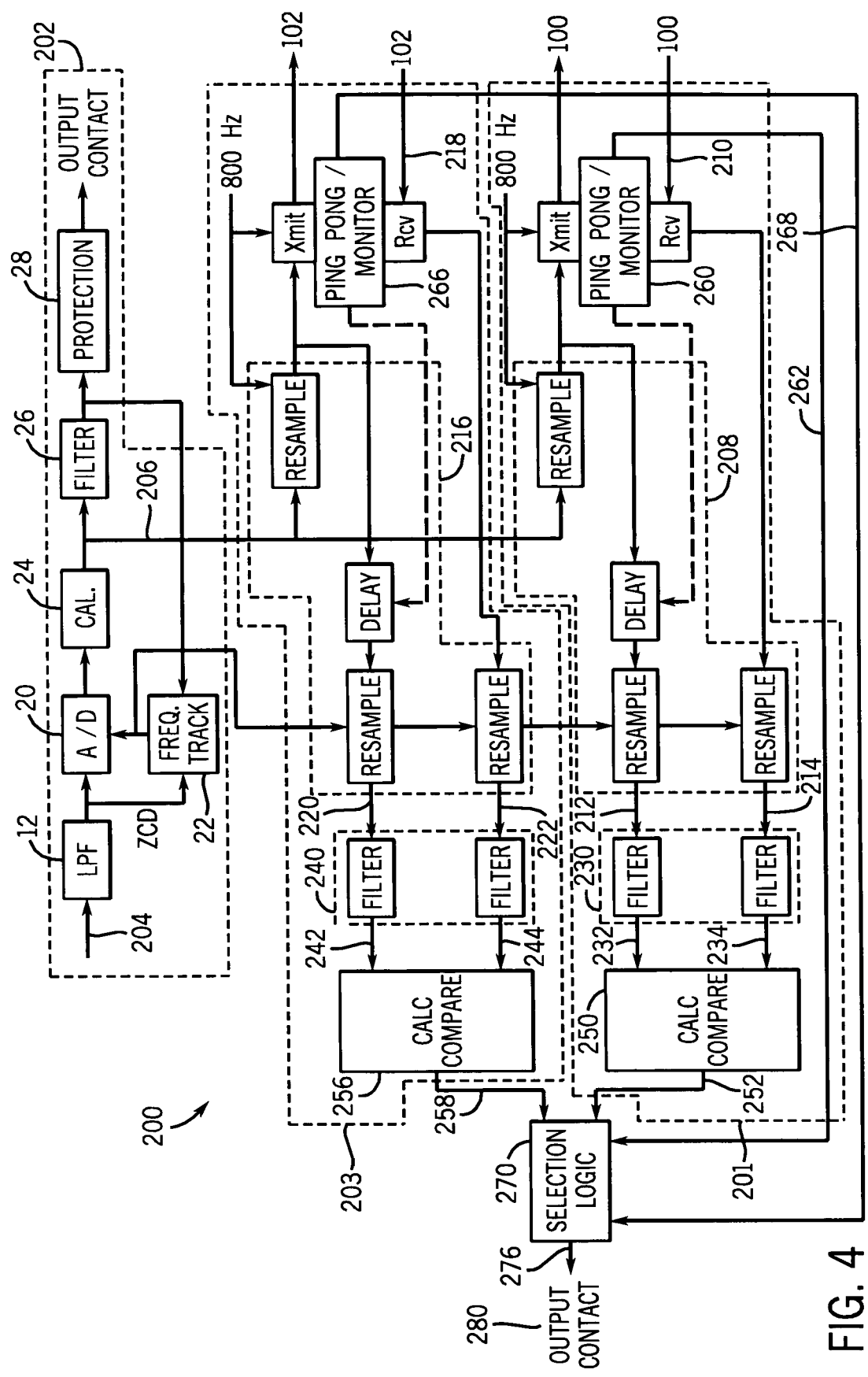
FIG. 4 is a more detailed block diagram of a relay having the dual communication line arrangement of FIG. 3 to provide substantially continuous current differential protection according to an embodiment of the invention.

FIG. 3 shows a dual communication line arrangement which remedies the above-described data delay. Two communication lines 100 and 102 are shown which extend between two relays, i.e. a remote (receiving) relay 104 and a local (transmitting) relay 106. In applicant's invention, the data from the transmitting relay is simultaneously transmitted on both channels 100 and 102. The data from both channels undergoes alignment, digital filtering and logic processing at the receiving relay. A switch 112 is positioned at the receiving relay. Switch 112 is normally positioned so that it connects with a first, primary channel 100. The outputs of the receiving relay are controlled by the algorithm-processed data from the first channel 100. When that channel is recognized to be faulty, by any conventional means, switch 112 is operated to switch over to the other communication channel 102. Processing of the information from the transmitting relay continues with very little, if any, lost data or delay, only the time necessary to operate the switch 112, in particular, the time from the detection of the faulty communication channel to the completion of the switch operation. System operation continues normally thereafter. FIG. 3 shows communication in one direction. The present invention is typically used bi-directionally, with switches operating at the receiving sections of both relays to control channel switching for both directions.

This arrangement results in a faster tripping action in response to a fault condition when there is a communication channel failure; further, there is no necessity that the channels be identical, since the data is transmitted over both channels simultaneously. Previous arrangements required that the channels be identical. Both of these are significant advantages over existing systems.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A first relay for performing current differential protection of a protected apparatus, the current differential protection utilizing a first and a second communication channel transmitting data between a second relay and the first relay, the first and second relays operating on respective portions of a power line of an electrical power system, the first relay comprising:

a local sample circuit configured to generate a local stream in response to receipt of an electrical current signal from a local power line portion;

a first processing circuit operatively coupled to the local sample circuit and the first communication channel, the first processing circuit configured to align, filter and compare the local stream and a first remote stream from the second relay to generate a first logic value, and to determine a first channel status based on the first remote stream;

a second processing circuit operatively coupled to the local sample circuit and the second communication channel, the second processing circuit configured to align, filter and compare the local stream and a second remote stream from the second relay to generate a second logic value, and to determine a second channel status based on the second remote stream; and a selection logic circuit operatively coupled to the first and second processing circuits, the selection logic circuit configured to determine a control signal based on the first channel status and the second channel status, the control signal applied to an output contact of the first relay.

2. The first relay of claim 1, where the control signal is selectively equivalent to one of the first logic value and the second logic value based on the first channel status and the second channel status, and wherein continuous current differential protection of the protected apparatus is provided when the control signal is transitioned between the first and second logic values.

3. The first relay of claim 1, wherein each of the local stream, the first remote stream and the second remote stream comprise respective streams of sampled current values.

4. The first relay of claim 1, wherein the first processing circuit comprises:

a first alignment circuit operatively coupled to the first communication channel and the local sample circuit, the first alignment circuit configured to align the local stream and the first remote stream to form a first aligned local stream and a first aligned remote stream, respectively;

a first filter circuit operatively coupled to the first alignment circuit, the first filter circuit configured to remove interfering signal components from the first aligned local stream and the first aligned remote stream to form a first filtered local stream and a first filtered remote stream, respectively;

a first calc compare circuit operatively coupled to the first filter circuit, the first calc compare circuit configured to compare the first filtered local stream with the first filtered remote stream to generate the first logic value; and a first ping/pong monitor circuit operatively coupled to the first communication channel and configured to determine the first channel status value, the first channel status value indicating a fault level of the first communication channel.

5. The first relay of claim 4, wherein the second processing circuit comprises:

a second alignment circuit operatively coupled to the second communication channel and the local sample circuit, the second alignment circuit configured to align the local stream and the second remote stream to form a second aligned local stream and a second aligned remote stream, respectively;

a second filter circuit operatively coupled to the second alignment circuit, the second filter circuit configured to remove interfering signal components from the second aligned stream and the second aligned stream to form a second filtered local stream and a second filtered remote stream, respectively;

a second calc compare circuit operatively coupled to the second filter circuit, the second calc compare circuit configured to compare the second filtered local stream with the second filtered remote stream to generate the second logic value; and a second ping/pong monitor circuit operatively coupled to the second communication channel and configured to determine the second channel status value, the second channel status value indicating a fault level of the second communication channel.

6. The first relay of claim 1, wherein the second relay is configured substantially identically to the first relay.

7. The first relay of claim 6, wherein the data is transmitted bi-directionally between the first and second relay, and wherein continuous current differential protection of an apparatus protected by the second relay is provided when a control signal of the second relay is transitioned between the first and second logic values.

8. The first relay of claim 1, wherein the first and second communication channels are substantially identical.

9. The first relay of claim 1, wherein the first and second communication channels are not identical.

10. The first relay of claim 2, wherein the data transmitted between the first and second relays includes protective and control information.

* * * * *